United States Patent [19]
Rosenthal et al.

[11] 3,919,278
[45] Nov. 11, 1975

[54] PRODUCTION OF ISOCYANATES FROM LOWER ALKYL ESTERS OF MONONUCLEAR AROMATIC CARBAMIC ACIDS

[75] Inventors: Rudolph Rosenthal, Broomall; John G. Zajacek, Strafford, both of Pa.

[73] Assignee: Atlantic Richfield Company, Los Angeles, Calif.

[22] Filed: June 13, 1974

[21] Appl. No.: 479,077

[52] U.S. Cl. ............................................. 260/453 P
[51] Int. Cl.² ...................................... C07C 118/00
[58] Field of Search ................................ 260/453 P

[56] References Cited
UNITED STATES PATENTS
2,409,712  10/1946  Schweitzer .................. 260/453

Primary Examiner—Lewis Gotts
Assistant Examiner—Dolph H. Torrence
Attorney, Agent, or Firm—Delbert E. McCaslin

[57] ABSTRACT

A method of maximizing the production of isocyanates from the lower alkyl esters of mononuclear aromatic carbamic acids by thermally decomposing the ester of said carbamic acid in a continuous process while said ester is dissolved in a suitable inert solvent at a suitable concentration and at suitable temperatures in the presence of an inert carrier agent to produce the isocyanate and alcohol as overhead products at concentrations in the vapor phase which minimize the recombination of the isocyanate and alcohol.

11 Claims, No Drawings ifc concentration range in an inert solvent in the presence of an inert carrier agent and the partial pressure of the isocyanate and alcohol thus produced and in the vapor phase are at concentrations such that their recombination is substantially completely inhibited.

Other objects of this invention will be apparent from the following detailed description of the invention and from the claims.

PRODUCTION OF ISOCYANATES FROM LOWER ALKYL ESTERS OF MONONUCLEAR AROMATIC CARBAMIC ACIDS

BACKGROUND OF THE INVENTION

In a copending application Ser. No. 449,291, filed Mar. 8, 1974, entitled PRODUCTION OF ISOCYANATES FROM ESTERS OF CARBAMIC ACIDS (URETHANES) a process is disclosed for the production of isocyanates from urethanes in general by thermally decomposing the urethane while it is dissolved in a suitable inert solvent to produce the corresponding isocyanate and alcohol which are recovered separately. This application discloses the general method applicable to a wide variety of esters of a wide variety of carbamic acids under both batch and continuous operations.

However, in accordance with the instant invention in order to have an improved and more economical process for the production of isocyanates specifically from the lower alkyl esters of mononuclear aromatic carbamic acids, for example diethyl toluene-2,4-dicarbamate, it is necessary to operate in a continuous manner while having an optimum concentration of the dicarbamate ester and isocyanate (including by-products) dissolved in the inert solvent reaction medium and in the presence of a suitable molar ratio of an inert carrier agent such as an inert carrier gas or inert carrier solvent to dicarbamate ester feed such that the concentrations of the isocyanate, for example the toluene diisocyanate and the alcohol, for example ethyl alcohol which are in the vapor phase are carried overhead and may be recovered separately while minimizing recombination. Thus high conversions and high selectivities are obtainable while at the same time by-product formation is minimized.

SUMMARY OF THE INVENTION

This invention relates to an improved method for producing isocyanates from the lower alkyl esters of mononuclear aromatic carbamic acids by thermally decomposing the ester at a temperature in the range of from 230°–290°C. while the ester is dissolved in an inert solvent utilizing a continuous reaction system and wherein the concentration of the ester, the isocyanate and by-products in the inert solvent is controlled to be in the range of from 1 mole percent to 20 mole percent. In addition the decomposition is carried out in the presence of an inert carrier agent at a molar ratio of inert carrier agent to ester feed of at least 3 to 1 to produce the isocyanate and corresponding alcohol at concentrations in the vapor phase above the liquid phase reaction medium, to substantially completely inhibit recombination of the isocyanate and alcohol thus produced in the decomposition reaction.

It is an object of this invention therefore, to provide an improved method for the production of isocyanates specifically from the lower alkyl esters of mononuclear aromatic carbamic acids.

It is another object of this invention to provide a method for the production of isocyanates from lower alkyl esters of mononuclear aromatic acids at high conversions and selectivities.

It is another object of this invention to continuously produce by thermal decomposition isocyanates from the lower alkyl esters of mononuclear aromatic carbamic acids wherein said esters are dissolved in a spe-

DESCRIPTION OF THE INVENTION

The specific lower alkyl esters of the mononuclear aromatic carbamic acids which are utilized in the improved method of this invention as the starting materials for the isocyanates are characterized by having the general formula $R(NHCOOR')_x$ wherein R is a substituted or unsubistututed benzene ring and R' is an alkyl radical containing from 1 to 3 carbon atoms with $x$ being 1 or 2, and R' being the same or different when $x$ is 2. If R is substituted the substituents are preferably selected from the lower alkyl groups having from 1 to 3 carbon atoms, nitro or halo and in particular chloro. R' is methyl, ethyl, propyl or isopropyl. Particularly preferred are the esters of the mononuclear dicarbamic acids such as dimethyl or diethyl esters of toluene dicarbamic acid. The most preferred compounds are diethyl toluene-2,4-dicarbamate, diethyl toluene-2,6-dicarbamate and mixtures thereof.

The process can be carried out at atmospheric, subatmospheric or superatmospheric pressures depending upon the solvents employed. However, in general, slightly superatmospheric pressures are preferred in order to provide a forward flow in the continuous process.

In accordance with the improvement of this invention for the production of isocyanates from esters of mononuclear aromatic carbamic acids reaction temperatures in the range of 230°–290°C. are employed. When the starting carbamate (urethane) is diethyl toluene-2,4-dicarbamate, reaction temperatures in the range of from 250° to 285°C. are the most preferred. The residence time in the reaction zone can be in the range of from 1 to 30 hours, but preferably in the range of from 3 to 20 hours.

It is a critical feature of this invention that in order to obtain optimum results, the overall concentration of urethanes and isocyanates (including by-products) in the reactor is maintained in a relatively narrow concentration range. It has been found that in general when concentrations of total urethanes and isocyanates in the reactor are kept in the range of 15 mole percent or less particularly in the case of the diethyl toluene-2,4-dicarbamate reaction, overall selectivities to toluene diisocyanate, the toluene monocarbamate-monoisocyanate, and recovered dicarbamate are about 90 mole percent. With concentrations in the 15 to 20 mole percent range a decrease in overall selectivities to the 80–90 mole percent range occurs. An additional drop in selectivity occurs when concentrations are increased to the 30 mole percent level with yields of less than 80 mole percent and selectivities drop still further in the 40 to 50 mole percent concentration range to about 40–55 mole percent.

Although exceedingly high yields could be obtained in accordance with the method of this invention if the concentration in the reactor is held to less than 1 mole percent such concentrations are obviously uneconomic because of the very low throughput. Thus the preferred operating range of concentrations in the process are from about 1 mole percent to about 20 mole percent with the most preferred range from both selectivity and economic considerations being from about 5 mole percent to about 15 mole percent.

An additional feature of this invention in order to obtain optimum results and minimize the recombination of the isocyanate and alcohol produced in the vapor phase is that the decomposition, in combination with maintaining the range of concentration of urethanes and isocyanates (including by-products) in the reactor, is carried out in the presence of an inert carrier agent which may be an inert gas or an inert solvent or a mixture thereof. The carrier agent is employed at a molar ratio of carrier agent vapor to urethane feed of at least 3 to 1. Much higher ratios of carrier agent to urethane feed may be utilized for example, up to 110 to 1 or higher but obviously are avoided for economic reasons and the necessity of recovering the larger amounts of vaporous carrier agent. Mixtures of the inert carrier gas and inert carrier solvent may be used, for example, nitrogen and tetrahydrofuran. The percentages of each in the mixture may vary greatly. Generally, when a mixed carrier gas and solvent are employed in the method of this invention the inert gas may comprise the greater percentage.

The inert reaction medium solvent must be capable of completely dissolving the carbamate, i.e., the urethane, at reaction temperatures and in the concentrations stated and in addition be higher boiling than the isocyanate product. A second critieria of the solvent is that it be non-reactive with either the urethane or isocyanate. Preferred solvents are the higher molecular weight alkanes such as hexadecane, heptadecane, octadecane and the like and the higher molecular weight alkyl aryl hydrocarbons, for example, a monoalkylated benzene wherein the alkyl group can be either branched or straight chain and contains from 10 to 13 carbon atoms or mixtures of such alkyl benzenes wherein the mixture has an average of 11 carbon atoms in the alkyl group or higher molecular weight alkyl benzenes can be used. Another preferred alkyl benzene fraction has from 10 to 15 carbon atoms in the alkyl side chain, with over 90 weight percent of the mixture having from 12 to 14 carbon atoms with an average side chain of 13 carbon atoms attached to the benzene ring.

As indicated hereinabove, the alcohol and isocyanate after formation in the reaction medium are removed into the vapor phase either by the use of an inert carrier gas, an inert carrier solvent or mixtures of gas and solvent. The isocyanate and alcohol are then separated by suitable fractionation and/or partial condensation. When a solvent is employed to carry the products overhead, it can be used to assist in the condensation of either the isocyanate or alcohol.

The inert gases which can be employed as carrier agents include nitrogen, helium, argon, carbon dioxide, methane, ethane, propane and the like, either alone or in mixtures. Nitrogen is preferred because of its convenience.

The inert carrier solvents employed to carry the reaction product or products overhead are those which have a boiling point below the product isocyanate and do not decompose at the reaction temperature employed and in addition, these solvents cannot contain active hydrogens which, of course, would react with the isocyanate produced. In general any compound containing reactive groups that combine with the isocyanate should not be employed as carrier solvents in this invention. Mixtures of solvents may be used as the carrier agent.

The compounds which can be used as inert carrier solvents in this invention are the lower boiling solvents, that is, solvents having a boiling point below the isocyanate produced which, for example, with respect to toluene-2,4-diisocyanate (TDI) would be 251°C. and include aliphatic, cycloaliphatic or aromatic hydrocarbons or substituted hydrocarbons or mixtures thereof, and also certain oxygenated compounds such as ethers and ketones. Alcohols and acids cannot be used because of their reactivity with the generated isocyanate and, of course, water must be excluded. The sulfur analogues of the ethers and ketones can be employed.

Thus, more specifically suitable compounds for use as the inert carrier solvent include alkanes such as the pentanes, hexanes, heptanes, octanes, nonanes and decanes. The aromatics such as benzene, toluene, ortho-xylene, meta-xylene, para-xylene mixtures of two or more of the xylenes, ethylbenzene, cumene, diisopropylbenzenes, dibutylbenzenes, naphthalene, substituted benzenes non-reactive with isocyanates such as the nitro or halogenated compounds for example, the chlorobenzenes, nitrobenzenes and the like may be used. Likewise cycloaliphatic hydrocarbons such as cyclopentane, methylcyclopentane, 1,1-dimethyl cyclopentane, ethyl cyclopentane, cyclohexane, methyl cyclohexane, ethyl cyclohexane, cycloheptane and others of 5 to 7 carbon atoms may be used as the carrier agent.

Ethers (including cyclic ethers), polyethers and ketones which do not contain a substituent group which would react with an isocyanate can also be used, for example, tetrahydrofuran, dioxane and methyl ethyl ketone.

In the continuous process runs shown in the following Examples the general procedure follows:

The heavy solvent was placed in a round-bottom flask provided with two feed inlet tubes, a nitrogen inlet tube, a 12 inch Vigreaux column, a thermometer and a product dip tube. Table I shows the solvent and amount of solvent, and since nitrogen gas was employed as part of the carrier agent, the amount per hour is shown. In all runs the diethyl toluene-2,4-dicarbamate feed was dissolved in inert carrier solvent tetrahydrofuran (THF), the concentration and feed rate also is shown in Table I. Heavy solvent was pumped in at a rate sufficient to maintain a level which would give the desired residence time.

Table II shows the respective reaction conditions and results obtained. The components in the reactor in addition to the heavy solvent are the dicarbamate (urethane), the isocyanate produced, in these runs it is toluene-2,4-diisocyanate (TDI), together with such products as the monourethane-monoisocyanate, and heavier materials. The concentration of these combined materials is shown in Column 5 of Table II.

TABLE I

| Run No. | Solvent | Ml of Solvent | Conc. of Dicarbamate grams/ml sol'n | Feed rate Ml of Sol'n/hr. | $N_2$ Feed rate liters/hr. |
|---|---|---|---|---|---|
| 1 | n-hexadecane | 80 | 0.12 | 32 | 30 |
| 2 | n-hexadecane | 80 | 0.12 | 32 | 30 |
| 3 | n-hexadecane | 80 | 0.12 | 32 | 15 |
| 4 | Dodane-S* | 100 | 0.12 | 32 | 30 |
| 5 | Dodane-S | 80 | 0.12 | 32 | 30 |
| 6 | Dodane-S | 80 | 0.12 | 32 | 30 |
| 7 | Dodane-S | 100 | 0.12 | 32 | 30 |
| 8 | Dodane-S | 100 | 0.12 | 32 | 15 |
| 9 | Dodane-S | 80 | 0.24 | 32 | 30 |
| 10 | n-hexadecane | 60 | 0.12 | 32 | — |
| 11 | Octadecane | 60 | 0.12 | 32 | 15 |

*Dodane-S is a trade name for a monoalkylated benzene mixture wherein the straight chain alkyl groups attached to the benzene ring have from 10 to 13 carbon atoms with an average of 11.

TABLE II

| Col. No. | Temp. °C. | | | | Urethane, Isocyanate and By-Products | Mole % Yield TDI | | Mole % Yield Monourethane | | | | | | |
|---|---|---|---|---|---|---|---|---|---|---|---|---|---|---|
| Run No. | 1 | 2 | 3 | 4 | 5 | 6 | 7 | 8 | 9 | 10 | 11 | 12 | 13 | 14 | 15 |
| 1 | 265 | 150 | 8 | 110 | 5 | 2 | 80 | 82 | 4 | 8 | 12 | 3 | 97 | 1.6 | 0.8 |
| 2 | 250 | 180 | 20 | 110 | 8 | 1 | 84 | 85 | 2 | 8 | 10 | 2 | 97 | 1.8 | 0.85 |
| 3 | 250 | 180 | 10 | 65 | 12 | 2 | 67 | 69 | 5 | 13 | 18 | 3 | 90 | 2.5 | 1.25 |
| 4 | 250 | 130 | 15 | 120 | 10 | 2 | 81 | 83 | 5 | 3 | 8 | 2 | 93 | 1.5 | 0.75 |
| 5 | 250 | 150 | 10 | 90 | 16 | 4 | 66 | 70 | 8 | 6 | 14 | 4 | 88 | 1.8 | 0.9 |
| 6 | 240 | 130 | 13.5 | 100 | 19 | 2 | 66 | 68 | 6 | 5 | 11 | 4 | 83 | 1.6 | 0.8 |
| 7 | 250 | 115 | 20 | 120 | 26 | 3 | 65 | 68 | 5 | 3 | 8 | 2 | 78 | 1.4 | 0.7 |
| 8 | 250 | 145 | 20 | 70 | 42 | 2 | 40 | 42 | 4 | 8 | 12 | 1 | 55 | 2.1 | 1.05 |
| 9 | 250 | 125 | 1.2 | 35 | 15 | 18 | 17 | 35 | 35 | 3 | 38 | 18 | 91 | 3.3 | 1.65 |
| 10 | 275 | 180 | 10 | 25(a) | 6 | 3 | 71 | 74 | 2 | 18 | 20 | 1 | 95 | 7.0 | 3.50 |
| 11 | 285 | 180 | 9 | 65 | 10 | 1 | 79 | 80 | 2 | 8 | 10 | 1 | 91 | 2.7 | 1.35 |

(a) Tetrahydrofuran only as carrier agent.

1. Reactor (Temperature)
2. Top of Column (Temperature)
3. Residence Time (hrs.)
4. $N_2$ + THF Vapor/dicarbamate feed mole ratio
5. Mole per cent in reactor at steady state
6. Bottom effluent
7. Overhead
8. Total
9. Bottom effluent
10. Overhead
11. Total
12. Mole per cent Diurethane in bottoms
13. Total Mole per cent TDI, Monourethane and Diurethane
14. Mole per cent ethanol in Vapor
15. Mole per cent TDI in Vapor It will be apparent from the runs shown that cracking temperatures for the toluene-2,4-dicarbamate are preferably in the 250°–285°C. range, and that the total concentration of dicarbamate (urethane), isocyanate and by-products in the reactor solvent should preferably be below 20 mole percent and more preferably below 15 mole percent.

Although the runs shown were not designed to demonstrate all of the parameters it has been found in additional runs that it is preferable to reflux the monourethane back to the reactor as efficiently as possible in order to increase the yield of diisocyanate and eliminate a large recycle stream of monourethane; likewise it is preferable to maintain low mole percent concentration of the isocyanate and alcohol in the vapor phase in order to prevent recombination before they can be separately recovered.

We claim:

1. A method for maximizing the production of isocyanates from lower alkyl esters of mononuclear aromatic carbamic acids having the general formula $R(NHCOOR^1)_x$ wherein $R^1$ is a substituted or unsubstituted benzene ring, $R^1$ is an alkyl radical having from 1 to 3 carbon atoms and $x$ is 1 or 2, and $R^1$ being the same or different when $x$ is 2, by thermally decomposing the ester of said carbamic acid in a continuous process while said ester is dissolved in an inert solvent in which the total concentration of said ester and products produced therefrom by said decomposition is in the mole percent range of from about 1 to 20, said decomposition being at temperatures in the range of from 230 to 290°C. in the presence of an inert carrier agent at a mole ratio of inert carrier agent to ester of at least 3 to 1 to produce the isocyanate and corresponding alcohol as overhead products at concentrations in the vapor phase which minimize recombination of the isocyanate and alcohol.

2. A method according to claim 1 wherein the esters are selected from the group consisting of dimethyl and diethyl esters of toluene dicarbamic acid.

3. A method according to claim 2 wherein the ester is diethyl toluene-2,4-dicarbamate, diethyl toluene-2,6-dicarbamate or mixtures thereof.

4. A method according to claim 1 wherein the decomposition temperature is in the range of from 250° to 285°C. and the lower alkyl ester is diethyl toluene-2,4-dicarbamate.

5. A method according to claim 1 wherein the inert solvent is a higher molecular weight alkane or monoalkylated aryl hydrocarbon.

6. A method according to claim 5 wherein the solvent is selected from the group consisting of hexadecane, heptadecane, octadecane and monoalkylated benzene having from 10 to 15 carbon atoms in the alkyl group.

7. A method according to claim 1 wherein the total concentration of said ester and products produced therefrom in the reaction medium solvent is in the range of from about 5 mole percent to about 15 mole percent.

8. A method according to claim 1 wherein the inert carrier agent is an inert carrier gas, an inert carrier solvent or mixtures thereof.

9. A method according to claim 8 wherein the inert carrier gas is selected from the group consisting of nitrogen, helium, argon, carbon dioxide, methane, ethane and propane.

10. A method according to claim 8 wherein the inert carrier solvent is a compound or mixture of compounds selected from the group consisting of aliphatic, cycloaliphatic or aromatic hydrocarbons, substituted hydrocarbons, oxygenated compounds selected from ethers or ketones and the sulfur analogues of said oxygenated compounds.

11. A method according to claim 8 wherein the inert carrier agent is a mixture of nitrogen and tetrahydrofuran.

* * * * *

UNITED STATES PATENT OFFICE
CERTIFICATE OF CORRECTION

PATENT NO. : 3,919,278
DATED : November 11, 1975
INVENTOR(S) : Rudolph Rosenthal and John G. Zajacek It is certified that error appears in the above-identified patent and that said Letters Patent are hereby corrected as shown below:

Column 5, lines 66, 67 and 68 should read as follows:

"$R(NHCOOR')_x$ wherein R is a substituted or unsubstituted benzene ring, R' is an alkyl radical having from 1 to 3 carbon atoms and x is 1 or 2, and R' being"

Instead of:

"$R(NHCOOR^1)_x$ wherein $R^1$ is a substituted or unsubstituted benzene ring, $R^1$ is an alkyl radical having from 1 to 3 carbon atoms and x is 1 or 2, and $R^1$ being"

Column 6, line 52 should read as follows:

"atures in the range of from 230° to 290°C. in the"

Instead of:

"atures in the range of from 230 to 290°C. in the"

Signed and Sealed this second Day of March 1976

[SEAL]

Attest:

RUTH C. MASON
*Attesting Officer*

C. MARSHALL DANN
*Commissioner of Patents and Trademarks*